United States Patent [19]
Hermann et al.

[11] Patent Number: 6,113,138
[45] Date of Patent: Sep. 5, 2000

[54] CONTROL DEVICE IN A MOTOR VEHICLE

[75] Inventors: Stefan Hermann, Koefering; Walter Baumgartner, Zeitlarn, both of Germany

[73] Assignee: Siemens Aktiengesellschaft, Munich, Germany

[21] Appl. No.: 08/987,548

[22] Filed: Dec. 9, 1997

[30] Foreign Application Priority Data

Dec. 9, 1996 [DE] Germany ............................ 196 51 123

[51] Int. Cl.$^7$ .............................. B06R 21/32; B60K 28/14
[52] U.S. Cl. .............................................. 280/735; 180/282
[58] Field of Search ............................ 280/735; 180/274, 180/282, 232; 701/70

[56] References Cited

U.S. PATENT DOCUMENTS

| | | | |
|---|---|---|---|
| 5,247,466 | 9/1993 | Shimada et al. ........................ | 702/141 |
| 5,261,506 | 11/1993 | Jost ......................................... | 280/735 |
| 5,322,323 | 6/1994 | Ohno et al. ............................. | 280/735 |
| 5,338,062 | 8/1994 | Kiuchi et al. ........................... | 280/735 |
| 5,369,580 | 11/1994 | Monji et al. ............................ | 180/282 |
| 5,483,447 | 1/1996 | Jeenicke et al. ........................ | 180/274 |
| 5,513,109 | 4/1996 | Fujishima ............................... | 180/274 |
| 5,746,444 | 5/1998 | Foo et al. ................................ | 280/735 |
| 5,797,111 | 8/1998 | Halasz et al. ........................... | 701/103 |
| 5,890,084 | 3/1999 | Halasz et al. ............................. | 701/45 |
| 6,023,664 | 3/2000 | Bennet ................................... | 702/141 |
| 6,036,224 | 3/2000 | Wachter et al. ........................ | 280/735 |

FOREIGN PATENT DOCUMENTS

4110374A1 10/1991 Germany .
4228414A1 3/1994 Germany .

*Primary Examiner*—Brian L. Johnson
*Assistant Examiner*—Michael Britton
*Attorney, Agent, or Firm*—Herbert L. Lerner; Laurence A. Greenberg; Werner H. Stemer

[57] ABSTRACT

A control device in a motor vehicle for detecting an impact and for detecting a rotational movement includes a transversal acceleration pick-up in each half of the vehicle, as defined by the longitudinal axis of the vehicle, and a longitudinal acceleration pick-up. An evaluation device evaluates longitudinal acceleration and transversal acceleration variables and derives a rotational movement variable from the transversal acceleration variables.

8 Claims, 3 Drawing Sheets

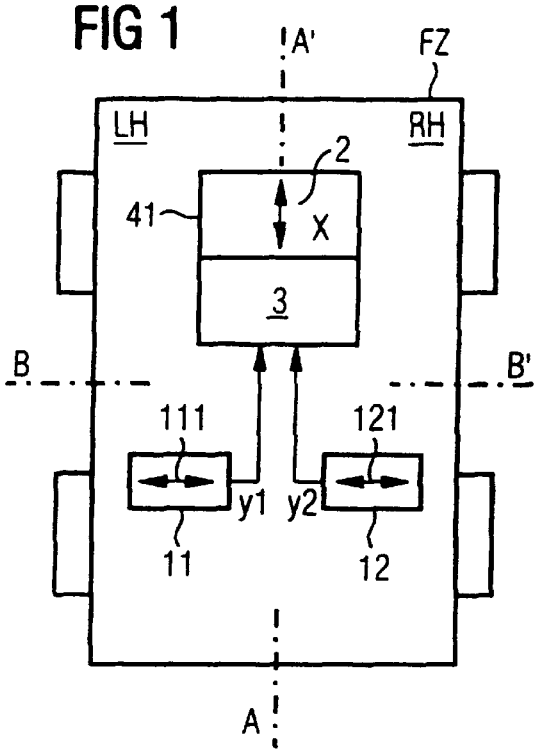
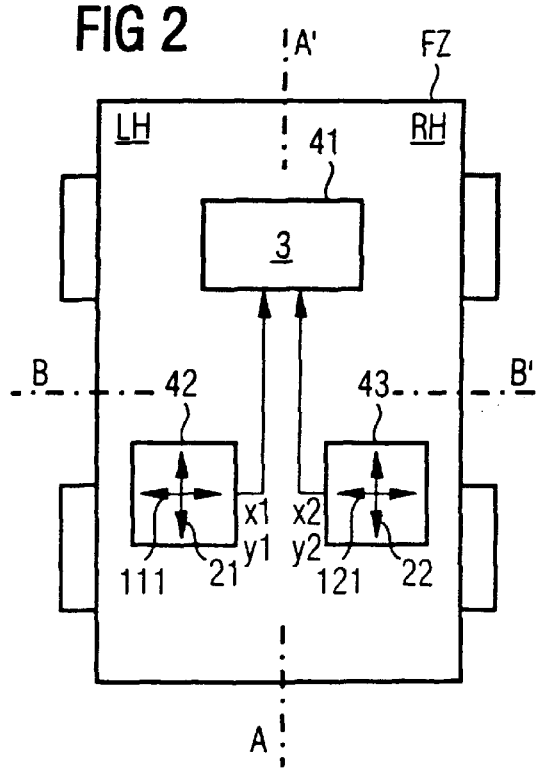

CONTROL DEVICE IN A MOTOR VEHICLE

BACKGROUND OF THE INVENTION

Field of the Invention

The invention relates to a control device in a motor vehicle.

A control device for a motor vehicle for detecting an impact or a linear deceleration resulting from an impact is preferably used in a control device for at least one vehicle-occupant protection device of the motor vehicle. Conventional control devices detect and process decelerations which are parallel and transversal with respect to the longitudinal axis of the vehicle. Conventional vehicle-occupant protection systems for motor vehicles correspondingly have a control device, at least one restraining device for side impact protection in each half of the vehicle and at least one restraining device for head-on impact protection. The former restraining devices are preferably side air bags and/or head air bags and the latter are preferably driver and/or front seat passenger air bags and/or seat belt retractors.

A configuration which is disclosed in U.S. Pat. No. 5,544,915, for detecting an impact from the side and an impact from the front, has a sensor configuration which contains a transversal acceleration pick-up in the form of a transversal acceleration sensor in each half of the vehicle. In order to detect an impact from another direction, the proposed sensor configuration has a control unit disposed centrally in the vehicle which contains a longitudinal acceleration pick-up with two acceleration sensors that are aligned at ±45° with respect to the longitudinal axis of the vehicle. The central control unit also has an evaluation device which firstly detects impacts and/or decelerations in terms of strength and direction in a plane which is determined by the longitudinal axis of the vehicle and the transversal axis of the vehicle, as a function of the signals of the motor vehicle. Therefore, in particular in the case of impacts from the front, from the side or at a different angle in the plane, the restraining device for head-on impact protection is triggered with the aid of the two longitudinal acceleration pick-ups, and the restraining device for side impact protection is triggered as a function of the signals of the transversal acceleration pick-ups.

In addition, configurations for detecting a rotational movement of a motor vehicle are known which make use of a rotational movement sensor, which is also referred to as rotational speed sensor, that is used in particular for the purpose of detecting tilting of the vehicle about its longitudinal axis. Such rotational movement sensors are disposed approximately at the center of gravity of the vehicle and are aligned in accordance with a roll-over movement to be picked up. Rotational movement sensors can operate according to different physical principles.

German Published, Non-Prosecuted Patent Application DE 41 10 374 A1 discloses a device for sensing a roll-over movement through the use of two linear acceleration sensors. A rotational movement variable is determined from the acceleration signals and the driving stability of the motor vehicle is controlled as a function of the rotational movement variable.

SUMMARY OF THE INVENTION

It is accordingly an object of the invention to provide a control device in a motor vehicle which has a simple structure and which is used for triggering a vehicle-occupant protection device.

With the foregoing and other objects in view there is provided, in accordance with the invention, a control device in a motor vehicle having a longitudinal axis defining halves of the vehicle, a protection device for head-on impact protection, protection devices for side impact protection each disposed in a respective half of the vehicle, and a protection device for roll-over protection, comprising a longitudinal acceleration pick-up; transversal acceleration pick-ups each disposed in a respective half of the vehicle; and an evaluation device for evaluating longitudinal acceleration and transversal acceleration variables and for deriving a rotational movement variable from the transversal acceleration variables; the evaluation device outputting a first control signal dependent at least on the longitudinal acceleration, to the protection device for head-on impact protection; the evaluation device outputting a second control signal dependent at least on the transversal acceleration, to the protection devices for side impact protection, with the transversal acceleration received or picked-up by the protection devices for side impact protection in the halves of the vehicle being determinative or decisive; and the evaluation device outputting a third control signal dependent on the rotational movement variable, to the protection device for roll-over protection.

In a motor vehicle, it is possible to detect impacts and/or decelerations in terms of strength and direction in a plane which is determined by the longitudinal axis of the vehicle and the transversal axis of the vehicle with a minimum number of acceleration sensors which sense three linear accelerations. Therefore, in particular impacts from the front, from the side or at an angle in the plane are detected with the aid of two transversal acceleration pick-ups and with the aid of the longitudinal acceleration pick-up. If the vehicle tilts as a result of an accident or as a result of being guided on a skewed plane about its longitudinal axis, this rotational movement is also detected by the two transversal acceleration sensors. A rotational movement variable of the vehicle is derived in the evaluation device of the configuration from the transversal acceleration variables supplied by the transversal acceleration pick-ups. It is no longer necessary to use rotational movement sensors. Instead, it is possible to use acceleration sensors for linear movements, which are of simple construction and widely available, and therefore inexpensive.

According to the invention, a sliding movement variable can additionally be derived from the signals/variables supplied by the transversal acceleration pick-ups. The sliding movement variable is distinguished by a rotational movement of the vehicle about its vertical axis.

The control device according to the invention permits all of the vehicle occupants to be protected as well as possible as a function of the strength and direction of the detected impact and/or the detected rotational movement. At the same time, the control device is of an extremely simple construction and requires only three acceleration sensors in its basic level of equipment.

In accordance with another feature of the invention, the transversal acceleration pick-ups are constructed as acceleration sensors with a sensitivity which is aligned approximately with the longitudinal axis of the vehicle. They are preferably mounted in a side component of the vehicle, for example the vehicle door, or in or on the vehicle seat, or the B pillar. This spatial configuration ensures, on one hand, that the protection devices for side impact protection are activated within an extremely short time after the start of the impact since, on one hand, the sensitivity axes of the transversal acceleration sensors are aligned in the expected direction of the impact and, on the other hand, the transversal acceleration pick-ups are mounted near the location of the impact so that a transmission of signals, for example to a transversal acceleration pick-up disposed centrally in the vehicle, which would entail losses and take up time, is avoided. On the other hand, the detection of a rotational movement about the longitudinal axis of the vehicle requires a decentralized transversal acceleration pick-up configuration, that is to say one which is not disposed in the region of the vehicle tunnel or the center of gravity of the vehicle and is thus at a significant distance from the center of the vehicle.

In accordance with a further feature of the invention, the longitudinal acceleration pick-up is disposed centrally in the vehicle, for example at the vehicle tunnel, and has an acceleration sensor with a sensitivity axis which is aligned approximately parallel to the longitudinal axis of the vehicle.

In accordance with an added feature of the invention, the evaluation device for the signals supplied by the pick-ups is also disposed centrally in the vehicle.

In accordance with an additional feature of the invention, the evaluation device and the longitudinal acceleration pick-up are disposed in a common central control unit, and if appropriate on a common circuit carrier. Long line lengths between a longitudinal acceleration pick-up which is disposed in a decentralized manner and a centrally disposed evaluation device are avoided. The central control unit is disposed in a central region of the vehicle, in each case it is not decentralized in its peripheral areas, and it has a housing or a plastic casing for encapsulating the longitudinal acceleration pick-up and the evaluation device in a sealed manner. The transversal acceleration variables, or the transversal acceleration variables which have already been evaluated in advance, of the transversal acceleration pick-ups which have been disposed in a decentralized manner are fed to the central evaluation device through lines or a data bus.

In accordance with yet another feature of the invention, the longitudinal acceleration pick-up has a longitudinal acceleration sensor in each half of the vehicle. Longitudinal and transversal acceleration pick-ups of one half of the vehicle are constructed in this case as a compact component. They are preferably disposed on a common carrier.

In accordance with yet a further feature of the invention, there are provided decentralized control units each disposed in a respective half of the vehicle and each containing one of the transversal acceleration pick-ups and one of the longitudinal acceleration sensors.

A decentralized control unit contains the component which is disposed in a sealed enclosure, for example in a sealed housing or a cast casing, so that the acceleration sensors are protected against environmental influences such as dampness or corrosion. The decentralized control units can be manufactured with little use of material in a few production steps. The decentralized control units are at a significant distance from the central region of the vehicle so that acceleration sensors on the left-hand side and acceleration sensors on the right-hand side supply distinguishable signals due to their different spatial positioning. The decentralized control units are preferably disposed on a vehicle seat, in such a way that the left-hand side control unit is disposed at the driver's seat and the right-hand side control unit at the front passenger's seat. Alternatively, the decentralized control units are disposed at side components of the vehicle, with the left-hand side control unit on the driver's door and the right-hand side control unit on the front passenger's door.

With such a decentralized configuration of the longitudinal acceleration sensors, acceleration components of oblique impacts in particular, for example at ±45° with respect to the longitudinal axis of the vehicle, can be sensed near the location of the impact with increased sensor sensitivity, virtually without loss or delay, by the longitudinal acceleration sensors that are disposed in a decentralized manner. In addition, it is possible for any impact acting on the vehicle to be detected independently, in terms of its strength and direction, in two ways, both by the right-hand side control unit and by the left-hand side control unit. This sensor configuration makes it possible to use the signals of one control unit/acceleration sensor to check the signals of the control unit/acceleration sensor in the other half of the vehicle. In this case, the acceleration sensors are not merely of redundant construction in the left-hand side and right-hand side halves of the vehicle but are rather distributed in a decentralized manner in the vehicle in order to achieve optimized recording of the signals. In addition, it is advantageous that upon a failure of an acceleration sensor of one control unit, the acceleration sensor of the other control unit can assume the function of the failed sensor.

Both centrally disposed longitudinal acceleration sensors and those disposed in a decentralized manner have sensitivity axes which are aligned approximately parallel to the longitudinal axis of the vehicle: in each case, an acceleration which acts on the vehicle in the direction of its longitudinal axis is detected through the longitudinal acceleration pick-up. However, at the same time, the longitudinal acceleration pick-up can also have acceleration sensors with a sensitivity axis aligned in any desired manner in the plane defined by the longitudinal and transversal axis of the vehicle, as long as all of the sensors are not aligned transversely with respect to the longitudinal axis of the vehicle, that is to say parallel to the longitudinal axis of the vehicle, and are thus insensitive to accelerations acting on the vehicle longitudinally. Thus, for example, the centrally disposed longitudinal acceleration pick-up can have two acceleration sensors which are disposed offset by ±45° with respect to the longitudinal axis of the vehicle. If appropriate, in the case of a longitudinal acceleration pick-up which is of decentralized construction, an acceleration sensor that is disposed in a decentralized manner can also be at an angle with respect to the longitudinal axis of the vehicle. At the same time, if appropriate, this can also apply to the transversal acceleration sensor disposed in this half of the vehicle. In each case, accelerations which act longitudinally on the vehicle and accelerations which act transversely on the vehicle can be detected through the use of the longitudinal acceleration pick-up and the two transversal acceleration pick-ups.

If the decentralized control units have longitudinal acceleration sensors, any longitudinal or transversal acceleration sensor which is disposed in a decentralized manner can be connected to the evaluation device through a separate electrical line. However, each decentralized control unit is preferably connected to the central evaluation device through the use of a single line, which is used jointly by the two acceleration sensors of the control unit, for serial data transmission, for example by using the multiplex method. Preferably, the two decentralized control units are connected to the evaluation device through a common data bus.

A central configuration of the evaluation device in the vehicle is then particularly advantageous if further sensors connected to the evaluation device are disposed in the central region of the vehicle and thus short line lengths are achieved.

In accordance with a concomitant feature of the invention, the first control signal depends on the longitudinal acceleration signals of the two longitudinal acceleration sensors.

Other features which are considered as characteristic for the invention are set forth in the appended claims.

Although the invention is illustrated and described herein as embodied in a control device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, plan view of a symbolic vehicle with a first configuration according to the invention;

FIG. 2 is a plan view of a symbolic vehicle with a second configuration according to the invention;

DESCRIPTION OF THE PREFERRED EMBODIMENTS

Figure 3:
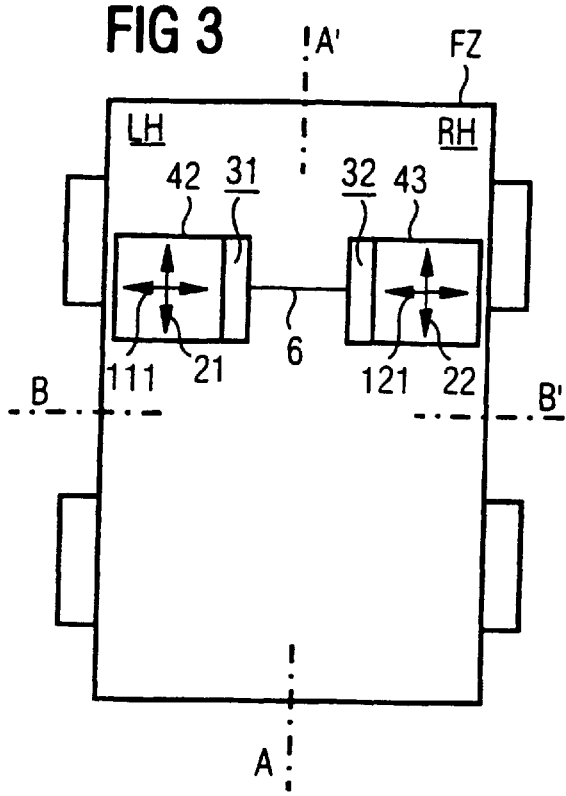
FIG. 3 is a plan view of a symbolic vehicle with a third configuration according to the invention.

Referring now in detail to the figures of the drawings, in which identical elements and variables are distinguished by the same reference symbols, and first, particularly, to FIG. 1 thereof, there is seen a symbolic vehicle FZ in a top-plan view, in which a longitudinal axis A–A' of the vehicle and a transversal axis B–B' of the vehicle are indicated. The longitudinal axis A–A' of the vehicle divides the vehicle into a left-hand side half LH and a right-hand side half RH. A control unit 41, which is disposed centrally in the vehicle, has a longitudinal acceleration pick-up 2 in the form of an acceleration sensor with a sensitivity axis that is aligned parallel to the longitudinal axis A–A' of the vehicle and is indicated by an arrow. In addition, the central control unit 41 contains an evaluation device 3 which is connected in an electrically conductive manner to transversal acceleration pick-ups 11 and 12 which are disposed in the halves LH and RH of the vehicle in a decentralized manner. Each transversal acceleration pick-up 11 and 12 is constructed as a transversal acceleration sensor 111 and 121 with a sensitivity axis (indicated by an arrow) parallel to the transversal axis B–B' of the vehicle. The transversal acceleration sensor 111 which is disposed on the left-hand side supplies a left-hand side transversal acceleration y1 to the evaluation device 3, and the right-hand side transversal acceleration sensor 121 supplies a right-hand side transversal acceleration y2.

FIG. 2 shows a symbolic vehicle FZ in a plan view with a further configuration according to the invention. The central control unit 41 in this case merely contains the evaluation device 3 in the form of a microprocessor. The longitudinal acceleration pick-up 2 is composed of two longitudinal acceleration sensors 21 and 22 which are disposed in a decentralized manner. The longitudinal acceleration sensor and the transversal acceleration sensor of the same vehicle half together form one control unit. A left-hand side control unit 42 supplies a left-hand side longitudinal acceleration x1 as well as a left-hand side transversal acceleration y1 to the evaluation device 3. A right-hand side control unit 43 supplies a right-hand side longitudinal acceleration x2 and a right-hand side transversal acceleration y2 to the evaluation device 3.

FIG. 3 contains a further inventive configuration. In this case, in comparison to FIG. 2, the centrally disposed evaluation device 3 is divided into two evaluation units 31 and 32 in the left-hand side and right-hand side halves LH and RH of the vehicle. Each decentralized control unit 42 and 43 contains a longitudinal acceleration sensor 21 and 22, a transversal acceleration sensor 111 and 121 and an evaluation unit 31 and 32. The left-hand side and right-hand side evaluation units 31 and 32 are connected to one another over a data line 6. The advantage of this control device is that lines between sensors which are disposed in a decentralized manner and a centrally disposed evaluation device are dispensed with. The reliability of the vehicle-occupant protection system according to the invention is increased due to the fact that, in particular, long lines are susceptible to faults.

Figure 4:
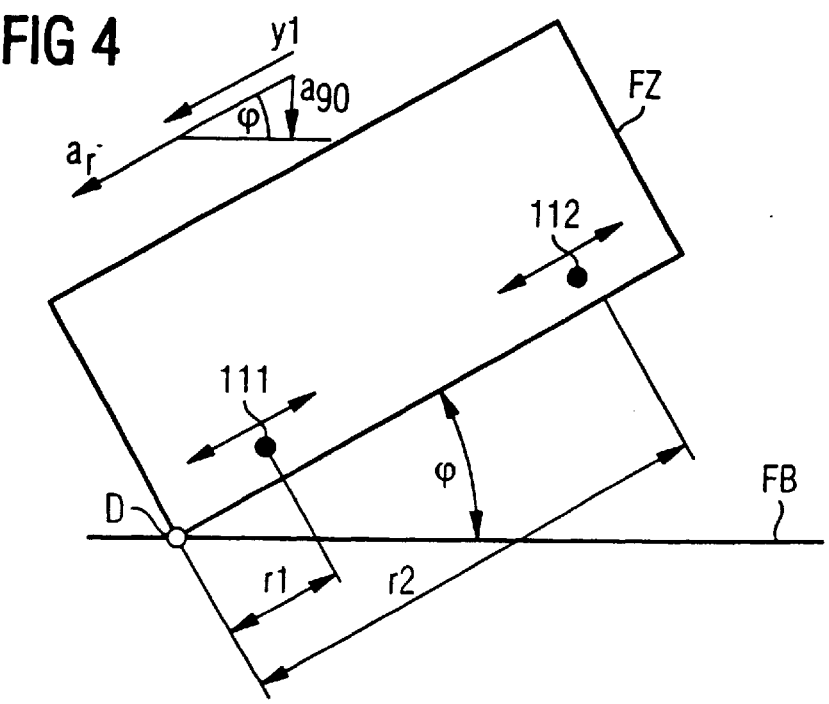
FIG. 4 is a cross-sectional view of a vehicle which is indicated symbolically and which is subjected to a tilting movement.

FIG. 4 shows a symbolically represented vehicle FZ in cross section. The vehicle FZ has a rotational angle $\phi$ with respect to a roadway FB as a result of a rotational movement about its longitudinal axis which is directed in the plane of the drawing. The rotational movement takes place in particular about a center of rotation D or a rotational axis D which is parallel to the longitudinal axis of the vehicle. In the case of such a rotational movement, the transversal acceleration sensors 111 and 112 supply the transversal accelerations y1 and y2 to the evaluation device 3. A rotational movement variable, for example the rotational angle $\phi$, an angular speed $\omega$ or an angular acceleration $\alpha$ of the vehicle is determined from these transversal acceleration variables y1 and y2 in the evaluation device 3. The left-hand side transversal acceleration y1 which is supplied is composed, for example in the case of a rotational movement of the vehicle, of two components: one component $a_r$ which is determined by the radial acceleration, and a further component which is determined by the acting acceleration $a_{g0}$ due to gravity. The acceleration $a_{g0}$ due to gravity is included, with the sine of the rotational angle $\phi$, in the supplied left-hand side transversal acceleration y1. The component $a_r$ of the radial acceleration results from the squared angular speed $\omega$ multiplied by a distance $r_1$ of the transversal acceleration sensor 111 from the center of rotation D, so that the transversal acceleration sensor 111 supplies an acceleration $y_1$ in accordance with the following equation:

$$y_1 = \omega^{2*}r_1 + a_{g0}{*}\sin\phi \qquad (1).$$

The following applies to the transversal acceleration sensor 112:

$$y_2 = \omega^{2*}r_2 + a_{g0}{*}\sin\phi \qquad (2),$$

where $d_r = r_2 - r_1$.

A distance $d_r$ between the transversal acceleration sensors 111 and 112 is known, so that the following differential equation is obtained by subtracting equation (2) from equation (1):

$$y_2 = \omega^{2*}d_r + y_1 - 2^*a_{g0}{*}\sin\phi \qquad (3).$$

It is possible to derive one of the rotational movement variables $\phi$, $\omega$ or $\alpha$ from equation (3) by using the relationships between the rotational movement variables $\phi$, $\omega$ and $\alpha$ ($\omega=d\phi/dt$, $\alpha=d\omega/dt$). It is possible to determine the center of rotation D of the vehicle by inserting the rotational movement variable which has been determined into one of the equations (1) or (2).

It is to be ensured in the configuration of the transversal acceleration pick-ups in the vehicle that, with respect to the detection of a rotational movement of the vehicle about its longitudinal axis, the transversal acceleration pick-ups 11 and 12 are, in particular, not disposed on a common axis parallel to the longitudinal axis A–A' of the vehicle.

Figure 5:
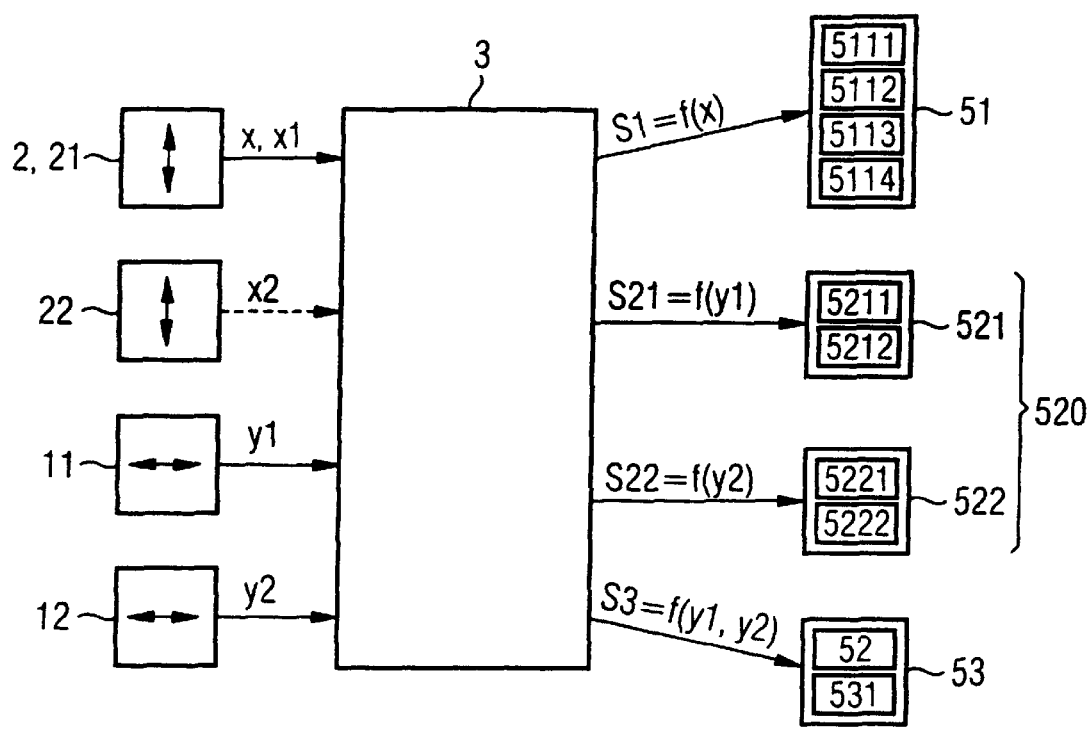
FIG. 5 is a block circuit diagram of an inventive control device of an inventive configuration according to FIGS. 1 or 2.

FIG. 5 shows a block circuit diagram of a configuration according to FIGS. 1 or 2 in a control device of a vehicle-occupant protection system. The evaluation device 3 is connected in an electrically conductive manner to the transversal acceleration pick-ups 11 and 12 in the halves of the vehicle which supply the left-hand side transversal acceleration $y_1$ and the right-hand side transversal acceleration $y_2$. According to FIG. 1, a centrally disposed longitudinal acceleration pick-up 2 supplies the longitudinal acceleration x to the evaluation device 3. According to FIG. 2, a longitudinal acceleration sensor 21 which is disposed on the left-hand side alternatively supplies the left-hand side longitudinal acceleration $x_1$, and a longitudinal acceleration sensor 22 which is disposed on the right-hand side supplies the right-hand side longitudinal acceleration $x_2$. The longitudinal acceleration pick-up 2 according to FIG. 1 may additionally contain a mechanical acceleration switch for longitudinal acceleration. The switch is included in the triggering decision depending on a second longitudinal acceleration sensor according to FIG. 2.

The evaluation device 3 is connected in an electrically conductive manner to various protection devices of the vehicle, in particular to a protection device 51 for head-on impact protection, to protection devices 521, 522 for side impact protection and to a protection device 53 for roll-over protection. The protection device 51 for head-on impact protection contains a driver's air bag 5111, a front passenger's air bag 5112, a left-hand side belt retractor 5113 and a right-hand side belt retractor 5114. The protection device 521 for side impact protection which is disposed on the left-hand side contains a side air bag 5211 and a head air bag 5212. The protection device 522 for side impact protection which is disposed on the right-hand side appropriately contains a side air bag 5221 and a head air bag 5222. The restraining device 53 for roll-over protection contains a roll over bar 531 as well as side air bags and head air bags 52 of the protection device for side impact protection. Protection devices are to be selected depending on the desired scope of the protection of the vehicle occupants.

Generally, selected, or if appropriate all of the acceleration signals or signals derived from them are evaluated in the evaluation device, for example by being compared with a threshold value or processed algorithmically. When the threshold value is exceeded or a triggering criterion is fulfilled during the algorithmic processing, the respective protection device is triggered. A plurality of protection devices may in particular be selected and triggered with staggered timing.

According to FIG. 5, the restraining device 51 for head-on impact protection is triggered at least as a function of the evaluated longitudinal acceleration x. If the configuration according to the invention has a mechanical acceleration switch, a first control signal s1 which is decisive for the protection device 51 for head-on impact protection uses the longitudinal acceleration x and the signal of the mechanical acceleration switch according to the criterion, to determine that the first control signal s1 contains a trigger instruction if the mechanical acceleration switch has become closed under the action of a minimum acceleration and if the evaluated longitudinal acceleration x fulfills all of the criteria for the triggering of the protection device 51 for head-on impact protection. In the case of a configuration with decentralized longitudinal acceleration sensors 21 and 22, one of the evaluated longitudinal acceleration signals can act as an enabling or disabling signal for the other evaluated longitudinal acceleration signal which determines triggering of the protection device 51.

In particular, the left-hand side transversal acceleration $y_2$ and the right-hand side transversal acceleration $y_2$ can also be included in the triggering decision relating to the restraining device 51 for the head-on impact protection. An evaluation of the transversal acceleration variables $y_1$ and $y_2$ is also advantageous for the triggering behavior of the restraining device 51 for head-on impact protection, particularly in the case of an oblique impact.

The left-hand side protection device 521 for side impact protection is controlled by a second control signal s21. The second control signal s21 is at least dependent on the left-hand side transversal acceleration $y_1$. Given sufficient rigidity of the vehicle body, the right-hand side acceleration signal $y_2$ can also be included as a protection function against mistriggering in the triggering decision relating to the left-hand side protection device 521 for side impact protection. A corresponding triggering strategy is proposed for the right-hand side protection device 522 for side impact protection. If appropriate, in order to also be able to trigger the protection device 520 for side impact protection in the case of an oblique impact, the longitudinal acceleration x or the longitudinal acceleration variables $x_1$ and $x_2$ can also determine the second control signals s21 and s22 for the protection device 520 for side impact protection.

A rotational movement variable is derived from the left-hand side transversal acceleration $y_1$ and the right-hand side transversal acceleration $y_2$ in the manner described above in accordance with FIG. 4. A third control signal S3 is supplied, at least as a function of this rotational movement variable, to the restraining device 53 for roll-over protection. In addition to a protection device which is specifically provided for the roll-over protection, such as the roll over bar 531, it is possible, as a function of at least the rotational movement variable which has been determined, to actuate a selection or all of the restraining devices for side impact protection 52, with the aid of which a vehicle occupant is protected as well as possible in the event of rolling over.

In the configuration according to FIG. 3, one of the evaluation units 31 or 32 is defined as the master evaluation unit which is electrically connected to the protection device 53 for roll-over protection. The rotational movement variable is determined in this evaluation unit, with the transversal acceleration signal of the other half of the vehicle being transmitted over the data line 6.

The following configurations are advantageous for additionally detecting a pitching movement, that is to say a rotational movement of the vehicle about its transversal axis B–B':

Preferably, the configuration according to FIG. 2 is modified in such a way that the right-hand side and left-hand side control units 21 and 22 continue to be disposed in the right-hand side and/or left-hand side halves LH and RH of the vehicle. However, one of the control units 21 or 22 is disposed in the front half of the vehicle and the other control unit 21 or 22 is disposed in the rear half of the vehicle with respect to the transversal axis B–B' of the vehicle.

Preferably, the configuration according to FIG. 1 is expanded with a longitudinal acceleration pick-up which is preferably disposed in the rear half of the vehicle with respect to the longitudinal axis A–A' of the vehicle, but is in particular not disposed together with the first longitudinal acceleration pick-up 2 on a common axis parallel to the transversal axis B–B' of the vehicle.

In both configurations, a rotational movement variable which distinguishes a pitching movement can be determined as a function of the longitudinal acceleration variables of the longitudinal acceleration pick-ups, corresponding to the determination of the rotational movement of the vehicle about its longitudinal axis in accordance with FIG. 4.

We claim:

1. In combination with a vehicle having a longitudinal axis defining halves of the vehicle, a protection device for head-on impact protection, protection devices for side impact protection each disposed in a respective half of the vehicle, and a protection device for roll-over protection, a control device for controlling various protection devices, comprising:

one longitudinal acceleration pick-up;

two transversal acceleration pick-ups each disposed in one respective half of a vehicle, and an evaluation device for evaluating longitudinal acceleration and transversal acceleration variables and for deriving a rotational movement variable from the transversal acceleration variables;

said evaluation device outputting a first control signal dependent at least on the longitudinal acceleration, to said protection device for head-on impact protection;

said evaluation device outputting a second control signal dependent at least on the transversal acceleration, to said protection devices for side impact protection, with the transversal acceleration received by said protection devices for side impact protection in the halves of the vehicle being determinative; and said evaluation device outputting a third control signal dependent on the rotational movement variable, to said protection device for roll-over protection.

2. The control device according to claim 1, wherein each of said transversal acceleration pick-ups contains an acceleration sensor with a sensitivity axis aligned approximately transversely with respect to the longitudinal axis of the vehicle.

3. The control device according to claim 1, wherein said longitudinal acceleration pick-up has an acceleration sensor disposed centrally in the vehicle and has a sensitivity axis aligned approximately parallel to the longitudinal axis of the vehicle.

4. The control device according to claim 1, wherein said longitudinal acceleration pick-up has acceleration sensors each disposed in a respective half of the vehicle and each having a sensitivity axis aligned approximately parallel to the longitudinal axis of the vehicle.

5. The control device according to claim 4, including decentralized control units each disposed in a respective half of the vehicle and each containing one of said transversal acceleration pick-ups and one of said longitudinal acceleration sensors.

6. The control device according to claim 1, wherein said evaluation device is disposed centrally in the vehicle.

7. The control device according to claim 6, including a control unit disposed centrally in the vehicle and containing said evaluation device and said longitudinal acceleration pick-up.

8. The control device according to claim 4, wherein the first control signal depends on the longitudinal acceleration signals of said two longitudinal acceleration sensors.

* * * * *